Jan. 19, 1971  B. M. CRAIG  3,555,774
FEEDING, PROPELLING, AND TENSIONING SYSTEM FOR TAPE
IN A SEED-TYPE MANUFACTURING MACHINE
Filed July 5, 1968  7 Sheets-Sheet 1
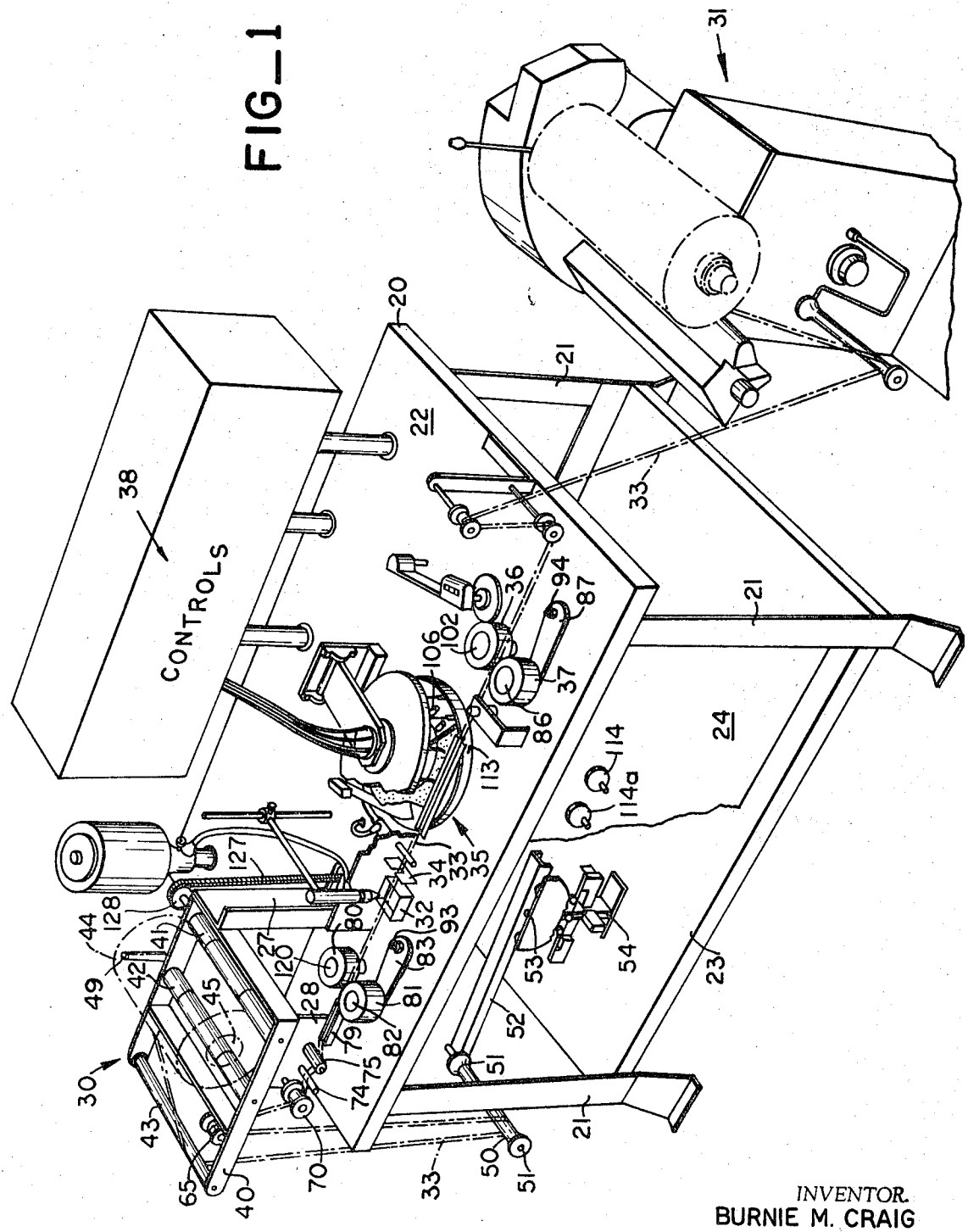
FIG_1
INVENTOR.
BURNIE M. CRAIG
BY
Owen, Wickersham & Erickson
ATTORNEYS

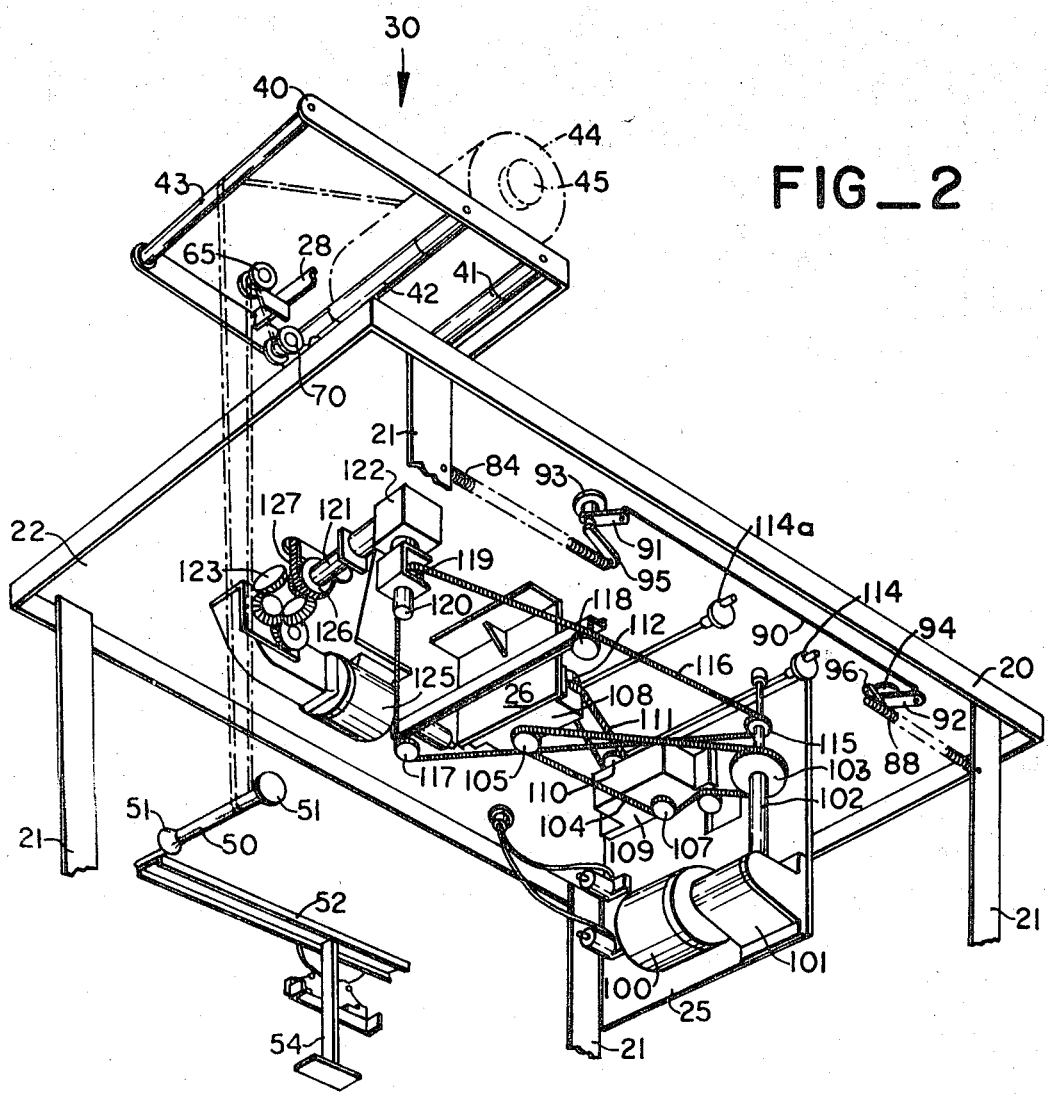
FIG_2

Jan. 19, 1971 B. M. CRAIG 3,555,774
FEEDING, PROPELLING, AND TENSIONING SYSTEM FOR TAPE
IN A SEED-TYPE MANUFACTURING MACHINE
Filed July 5, 1968 7 Sheets-Sheet 3
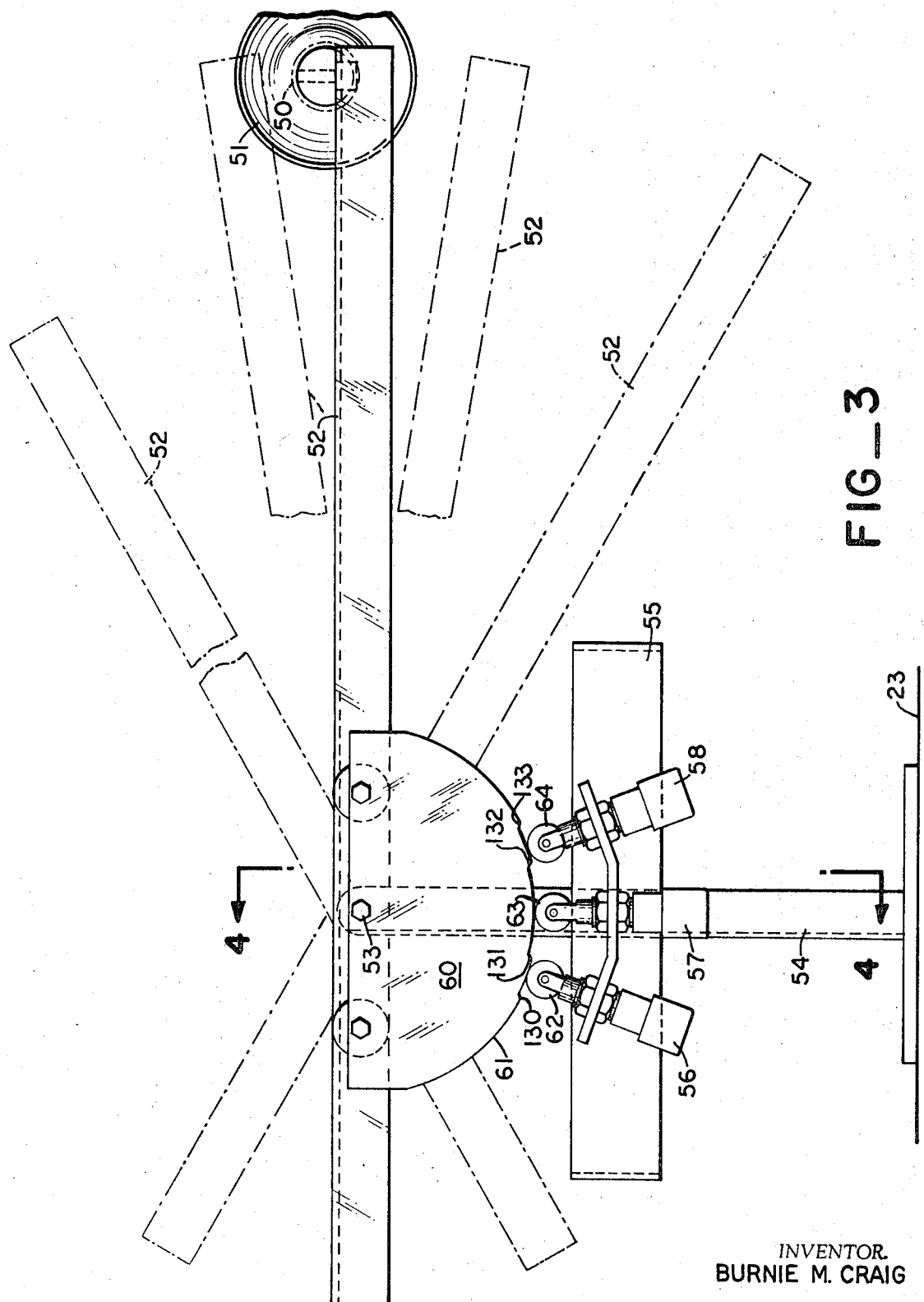
FIG_3
INVENTOR.
BURNIE M. CRAIG
BY
Owen, Wickersham & Erickson
ATTORNEYS

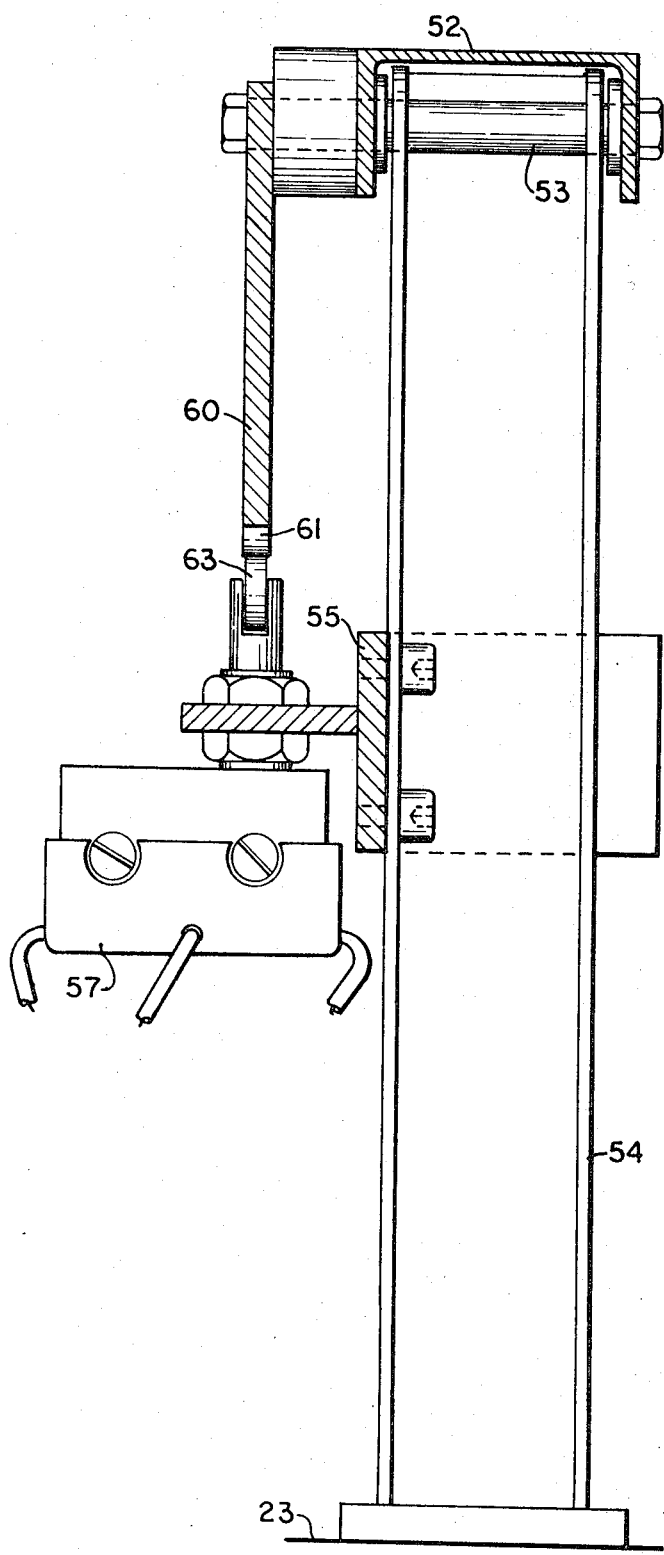

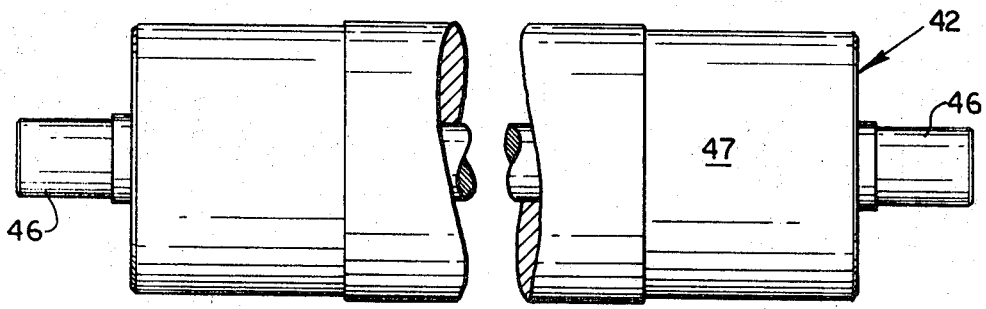
FIG_5
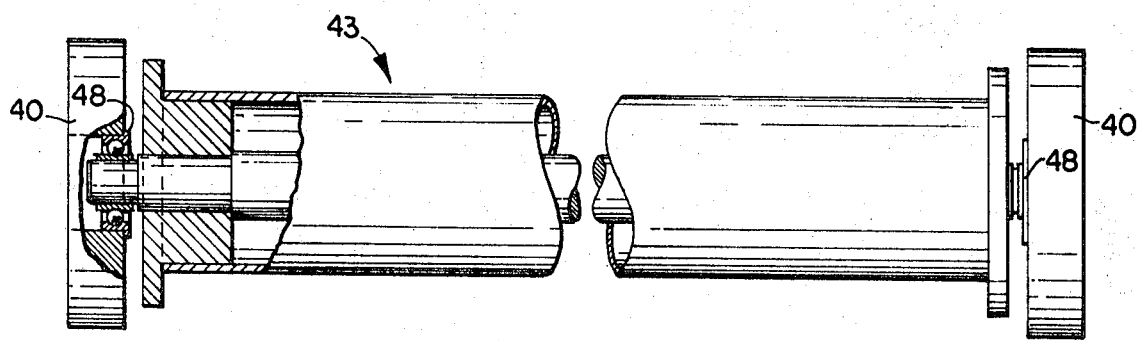
FIG_6
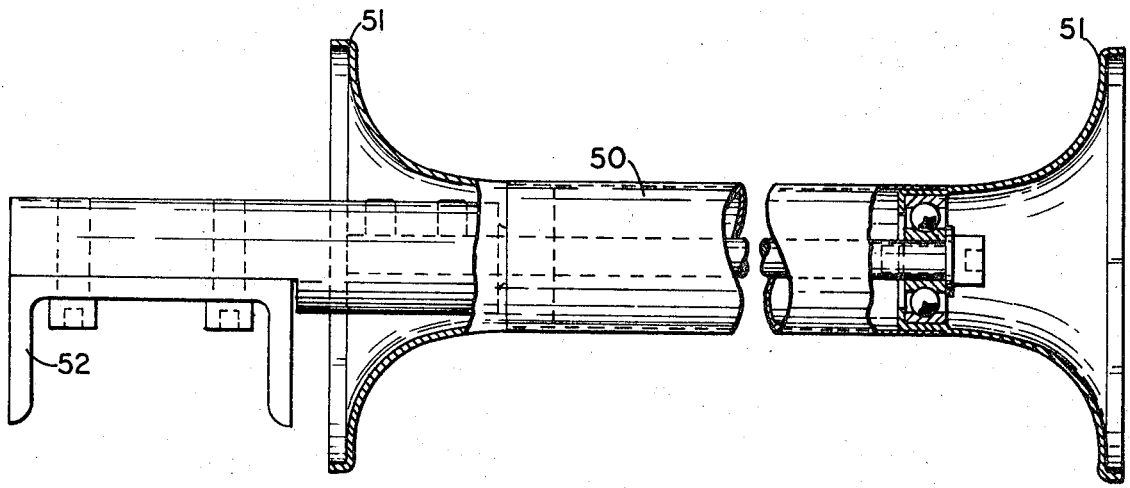
FIG_7

Jan. 19, 1971  B. M. CRAIG  3,555,774
FEEDING, PROPELLING, AND TENSIONING SYSTEM FOR TAPE
IN A SEED-TYPE MANUFACTURING MACHINE
Filed July 5, 1968  7 Sheets-Sheet 6
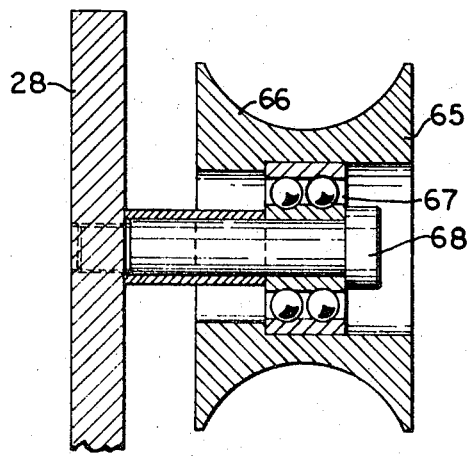
FIG_8
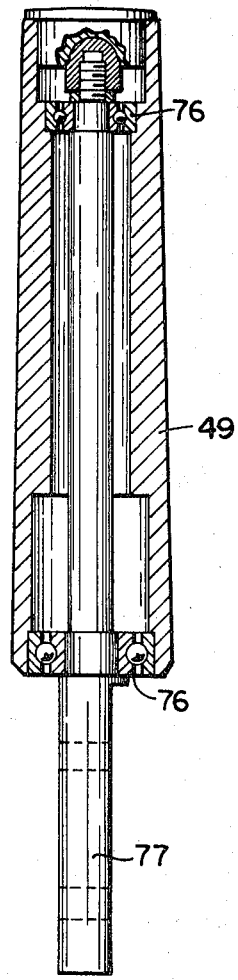
FIG_10
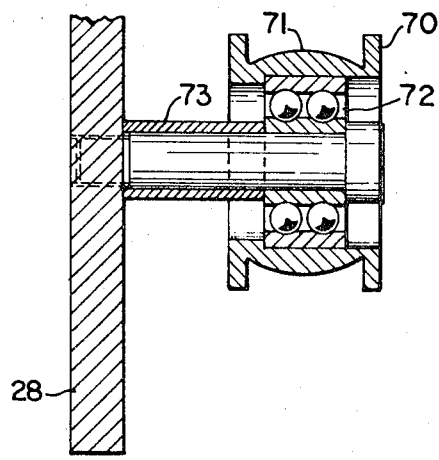
FIG_9
INVENTOR.
BURNIE M. CRAIG
BY
*Owen, Wickersham & Erickson*
ATTORNEYS Jan. 19, 1971  B. M. CRAIG  3,555,774
FEEDING, PROPELLING, AND TENSIONING SYSTEM FOR TAPE
IN A SEED-TYPE MANUFACTURING MACHINE
Filed July 5, 1968  7 Sheets-Sheet 7
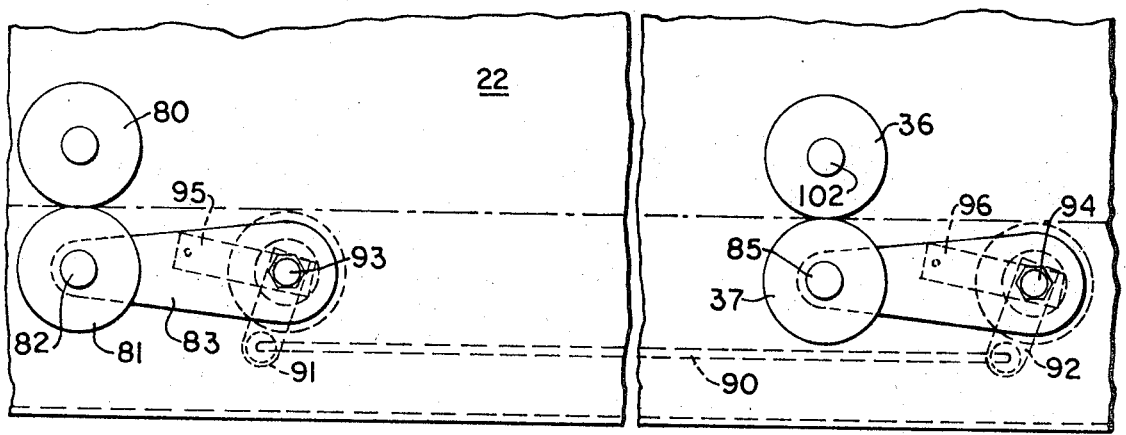
FIG_11
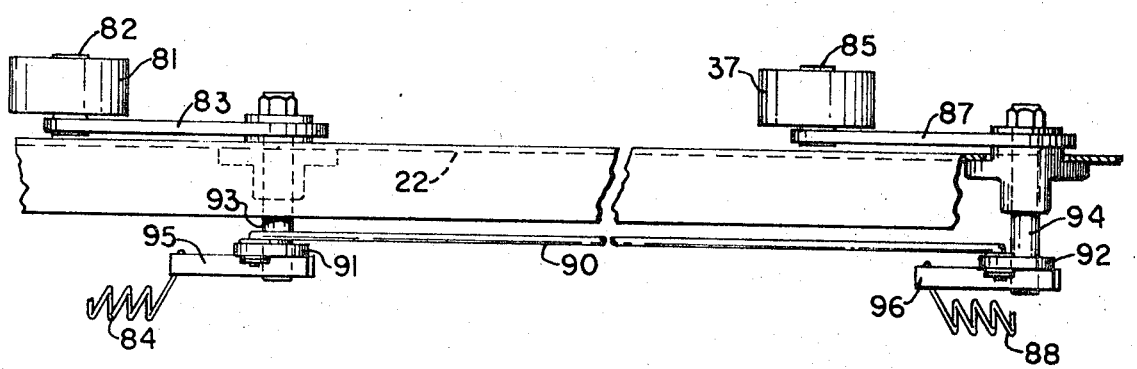
FIG_12
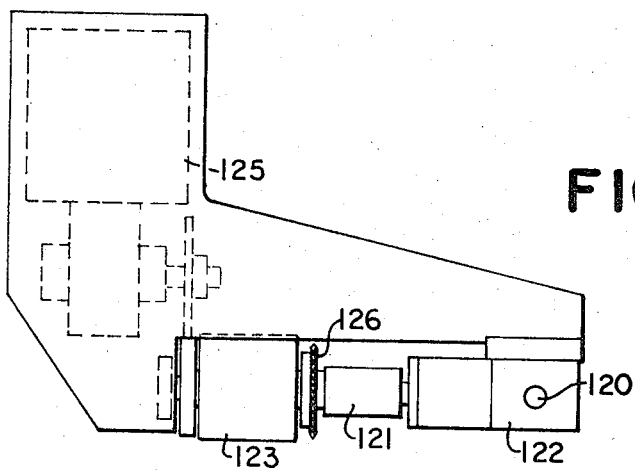
FIG_13
INVENTOR.
BURNIE M. CRAIG
BY
Owen, Wickersham Erickson
ATTORNEYS United States Patent Office 3,555,774
Patented Jan. 19, 1971

3,555,774
FEEDING, PROPELLING, AND TENSIONING SYSTEM FOR TAPE IN A SEED-TAPE MANUFACTURING MACHINE
Burnie M. Craig, Pasadena, Calif., assignor, by mesne assignments, to Union Carbide Corporation, New York, N.Y., a corporation of New York
Filed July 5, 1968, Ser. No. 742,604
Int. Cl. B65b 9/06
U.S. Cl. 53—180    16 Claims

ABSTRACT OF THE DISCLOSURE

In a seed-tape manufacturing machine, the tape is propelled by a main drive roller beyond the seed-dispensing station and driven by main drive means, with a main idler roller urged toward the main drive roller, the tape between them. A secondary drive roller and secondary idler roller precede the seed-dispensing station and are driven so that their peripheral speed is slower, at a fixed fraction of the speed of the main drive roller, so that the tape is stretched as it passes from the secondary rollers to the main rollers.

---

The tape supply is cylindrical and is supported partly by driven peripheral contact means for unwinding the tape. An auxiliary drive means acts through a differential on the peripheral contact means, and the main drive means also acts on the peripheral contact means, driving it at a basic rate on which the differential superimposes a positive or negative speed determined by the auxiliary drive means. Control means responsive to the speed at which the tape unwinds relative to the speed of tape propulsion by the two sets of rollers acts to change the speed of the auxiliary drive means and thereby the speed at which the tape unwinds.

This control means involves a first shaft and a second shaft spaced from the first shaft. The tape passes in tension between these shafts. A pivoted beam supports the second shaft for movement toward and away from the first shaft according to the length of the tape, by swinging the beam upon its pivot. A cam supported by the beam engages at time a plurality of microswitches, one of which acts to accelerate the auxiliary drive means when the length is short enough to tilt the beam a predetermined amount in one direction, and a second microswitch acts to decelerate the auxiliary drive means when the length is long enough to cause the beam to tilt a predetermined amount in the opposite direction.

This invention relates to an improved machine for manufacturing seed tape.

Seed tape preferably comprises a water soluable material such as polyethylene oxide enveloping carefully spaced-apart seeds. In order for seed tape to be practical, it must be economically manufactured by machine, such as the machines shown in patent applications Ser. No. 605,251 filed Dec. 28, 1966, now abandoned, and Ser. No. 710,014 filed Mar. 4, 1968. Economic manufacture requires rapid speed, and speed has brought on problems in the transport of the tape material through the machine. This invention is directed especially to the solution of these problems.

In the seed-tape manufacturing the tape is unwound from a storage roll or cylinder, moistened on at least a segment or strip thereof, troughed to receive seeds from a seed dispensing mechanism, and then after receiving the seeds, is folded over and pressed together and sealed by the moisture that was applied earlier. Then the tape is rewound. Heretofore, the unwinding of the tape from the supply roll or cylinder has been accomplished by simply idling a supply core, but idling has been found not to be fully satisfactory, because the tape has tended to come off in jerks or at uneven rates. Also, a very large roll has intially exerted a large inertia on the tape which tended to damage the tape, so that it has been very difficult to unwind properly a large enough roll to last a machine for several hours of rapid operation. Also, the differences in tension which developed as the supply diminished have had an adverse effect on the evenness of the spacing of the seed.

The present invention includes powered unwinding of the original storage roll to cause it to unwind at a constant rate, and mechanism for maintaining the proper tension on the tape and for assuring that it is fed to the machine at a rapid but steady manufacturing rate. The power operation is coupled with a series of tensioning rollers and guide rollers and with a sensing device that senses whether the tape is being unwound too fast or too slowly and means for changing the actual speed of operation of the unwinding roller to regulate the proper unwinding speed. The invention places a substantially constant tension on the tape, so that it is much less likely to break, and it has improved the speed spacing and enabled long terms of operation of the machine either without an attendant or with the attendant giving the machine only intermittent attention while he controls several of the machines at once. Thus, it has greatly helped the production speed and production cost of the seed tape.

An important feature of the invention is the exertion of tension on the tape during the time that the seed is being deposited thereon. Heretofore, there was a tendency for the tape to wobble or even sometimes to break because of changes in tension at this location. At that time the only control on the tension of the tape was what was exerted by the feed rollers, which were located past the seed dispensing station. I have found, however, that greatly improved control of tension can be attained by provoding two sets of driven rollers, that is, by adding a set of driven rollers ahead of the seed dispensing step and by driving that set at a slightly slower peripheral speed than that of the latter set. In this way, the tension exerted by the latter set stretches the tape somewhat, and I have found that, under the control provided by this invention, this stretching improves the tape's strength. Also, the control of tape tension assures that the tape is held steady without any wobbling and achieves much better positioning. The tape is kept from working its way over to one side; it is kept centered during the seed dispensing step, thereby making it easy to put the seed onto the tape and to achieve accuracy in spacing at a rapid rate of manufacture.

In connection with the above-discussed improvements in the seed manufacturing machine, there have been requirements for suitable mechanisms for achieving the desirable results just explained, and these have led to the development of particular apparatus for controlling the tape speeds and tensions, all as part of the present invention.

Other objects and advantages of the invention will appear from the following description of a preferred form of the invention.

In the drawings:

FIG. 1 is a view in perspective of a speed tape manufacturing machine embodying the principles of the invention. Some parts have been broken away to show parts otherwise obscured, and the unwound tape is shown in dot-dash lines.

FIG. 2 is a view in perspective looking from below at the driving mechanism and a portion of the tape feed mechanism of the machine of FIG. 1. The legs of the support table are broken off, and the tape is again shown by dot-dash lines.

FIG. 3 is a view in elevation of the cam and camoperated switches for controlling the unwinding speed of the tape. Two alternate positions of the pivoted beam, on which the cam and a take-up reel are mounted, are shown in broken lines, one of these being broken in the middle to conserve space.

FIG. 4 is a further enlarged view in section taken along the line 4—4 in FIG. 3.

FIG. 5 is an enlarged view in elevation of the shaft that supports the storage cylinder of tape to be unwound. The shaft is broken in the middle and shown there in section.

FIG. 6 is an enlarged view in elevation and partly in section of a guide shaft for the unwinding tape, also broken in the middle and shown there in section.

FIG. 7 is a similar view of the take-up roll and the beam of FIG. 3 to which it is secured.

FIG. 8 is an enlarged view in vertical section of the concave guide roller of FIG. 1.

FIG. 9 is an enlarged view in vertical section of the convex guide roller of FIG. 1.

FIG. 10 is an enlarged view in section of the braking roller of FIG. 1.

FIG. 11 is a fragmentary top plan view of the tape-tensioning and driving roller sets, the views being broken in the middle and intermediary parts omitted, the tape path being indicated by a single dot-dash line.

FIG. 12 is a view in elevation and partly in section of the parts in FIG. 11.

FIG. 13 is a bottom view of the differential mechanism.

This invention may be embodied in the machine shown in FIGS. 1 and 2. A main support table 20 has legs 21, a top 22 on which most of the operations take place, a lower deck 23, and a front panel 24, as well as several vertical brackets 25, 26, 27, 28, etc. for various machinery. A tape supply assembly 30 is shown located at one end of the table 20, while a tape takeup assembly 31 is shown as a separate unit located near the other end of the table 20. Between these two assemblies is a moistening station 32 where a strip 33 of the tape is moistened to enable later sealing, a troughing station 34 at which the tape 33 is formed into a trough shape to receive seeds, a seed dispensing station 35 which may embody the seed dispensing station shown in patent application Ser. No. 714,014 filed Mar. 4, 1968, and a pair of closing rollers 36 and 37, which acts to help to pull the tape 33 through the machine as they did in the former identified applications and to close the moistened sector of the tape 33 against other portions of the tape so as to seal the seed inside where it will be encapsulated substantially hermetically and protected from the effects of the atmosphere.

The moistening station 32, troughing station 34, and seed dispensing station 35 and the control panel 38 associated with them form no particular part of the present invention except as they are in combination with other members and cooperate with them. The seed, which is picked up either one seed at a time or one group of seeds at a time, is so dispensed into the troughed tape 33 that the desired spacing is achieved by the motion of the tape 33 relative to the speed of the seed dispensing apparatus and the distance apart of the seed dispensing nozzles.

The tape supply assembly 30 includes the bracket 27 and a frame 40 which supports for rotation a drive shaft 41, an idler shaft 42, and an idling guide and tensioning roller 43. The idler shaft 42 and drive shaft 41 support a roll or cylinder 44 of tape 33, which rests loosely on top of them. Several miles of this thin tape 33 can be supported on a cylindrical or frusto-conical core 45, which is wound so that the tape 33 is dispersed substantially evenly along the full width of the core 45, ending up in what is substantially a cylinder 44 of tape 33 on a cylindrical core 45. The shafts 41 and 42 (see FIG. 5) are substantially alike, having reduced ends 46 that are journaled in the frame 40 and an enlarged main body 47 that supports the tape cylinder 44 peripherally, with the tape cylinder 44 placed across the two shafts 41 and 42, bridging them and resting on them. Thus, rotation of the shaft 41 at a constant speed rotates the cylinder 44 at a constant peripheral speed to drive the periphery of the tape supply, so that the tape 33 is unwound at substantially the peripheral velocity of the drive roller 41. This peripheral velocity is carefully controlled, as will be seen below. A guiding roller 49 aids in this control.

The roller 43 (see FIG. 6) at the far end of the frame 40 is set in ball bearings 48 and extends the full width of the frame 40, to guide the unwinding tape 33 around what is substantially a right angle. No attempt is made to confine or positively control the tape in its motion back and forth, but it is allowed to move back and forth according to the position from which the tape 33 is unwound from its cylinder 44.

From the roller 43, the tape 33 goes down generally vertically and is guided around a tensioning and guide shaft 50 (see FIG. 7) having enlarged ends 51 with smoothly curved flanges to prevent the tape 33 from accidentally riding off the shaft 50. The shaft 50 is (see FIG. 7) supported at the end of an arm 52, which may be a channel beam and is mounted pivotally on a pivot shaft 53 (see FIGS. 4 and 3), so that it can swing about its pivot 53 and thereby enable the shaft 50 to move up and down under the tension of the tape 33, so that the distance of the shaft 50 from the roller 43 may be longer or shorter at any one moment of time, depending on the rate of movement of the tape 33 off its cylinder 40. A very important feature of this invention is that this speed is kept within certain limits. The pivot shaft 53 is mounted on a standard 54 which is itself mounted on the deck 23, and the standard 54 supports (see FIG. 4) a cross arm 55 that carries three microswitches 56, 57, and 58. The beam 52 carries a cam 60 whose cam surface 61 engages at some times each of three cam followers 62, 63, and 64 that respectively actuate the three microswitches 56, 57, and 58. These three microswitches 56, 57, and 58 act, as will be explained below, to control the speed of the shaft 41. Therefore, the length of the tape between the rollers 43 and the shaft 50, which depends on the unwinding speed of the tape 33, controls, through the cam 60 and the microswitches 56, 57, and 58, the unwinding speed of the tape 33, which, as will also be explained below, is related to the speed of the main drive rollers 36 and 37. The interaction of these various elements will be better understood after first describing the other rollers and guides along the path of the tape 33.

The tape 33 moves up from the lower guide and tension shaft 50 to a tap guide roller 65 (see FIGS. 1, 2, and 8), which may preferably have a concave surface 66 and is mounted on anti-friction bearings 67 and a stub shaft 68 to the bracket 28. From there, the tape 33 moves down to another guide roller 70 (see FIGS. 1, 2 and 9), which may preferably have a convex surface 71 and is mounted by an anti-friction bearing 72 to a stub shaft 73 supported by the bracket 28. The rollers 65 and 70 help to be sure that the tape 30 is straightened out. From the roller 70, the tape 33 moves over a cylindrical guide shaft 74, and under a stationary cylinder 75, to a preformed guide 79 that forms or shapes the tape 33 into a flattened U shape before it enters the first of the two sets of tensioning rollers, where it passes between the rollers 80 and 81, the roller 80 being driven while the other roller 81 idles. The roller 80 is twice the diameter of the roller 41.

The idling roller 81 is mounted for free rotation by a shaft 82 on an arm 83 (see FIGS. 1 and 2) and is urged by a spring 84 (FIG. 2) against the drive roller 80. Similarly, the main drive roller 36 and its idler roller 37 are arranged so that the roller 37 is supported by a shaft 86 on an arm 87 and is urged by a spring 88 against the drive roller 36. The arms 83 and 87 are joined together by a link rod 90 through cranks 91 and 92 and shafts 93 and 94 to which the arms 83, 87 and cranks 91, 92 are affixed. The springs 84 and 88 are anchored to the legs 21 and also to cranks 95 and 96 that are also affixed to the shafts 93 and 94. Hence, both rollers 81 and 37 can be opened away from their drive rollers 80 and 36 simultaneously, so that the tape 33 is then released from both sets of rollers. By slightly opening the arm 83 or the arm 87, only the roller 81 or 37 may be opened a short distance without opening the other roller 37 or 81, because of the back lash in the arms, shafts, and link rod. This makes it possible to remove and insert tape between one pair of rollers without having the tape run away or slip out from between the other pair of rollers.

The driving mechanism will be understood best with principal reference to FIG. 2. A motor 100 is connected by a right angle drive 101 to a drive shaft 102, which directly drives the main drive roller 36. A sprocket 103 on the main drive shaft 102 is connected by a chain 104 to a sprocket 105 on the seed dispensing mechanism 35 for rotating the seed dispensing nozzles 106 and to a sprocket 107. The sprocket 105 acts through gear reduction means 108, so that the nozzle speed can be varied, and the sprocket 105 acts through a speed varying gear box 109, sprocket 110, chain 111, and a sprocket 112 for rotating the seed dispensing tray 113, as explained in the earlier-mentioned patent application Ser. No. 710,014, filed Mar. 4, 1968. Control is obtained by wheels 114 and 114a (FIG. 1). Another sprocket 115 on the main drive shaft 102 drives a chain 116 provided with idler takeup sprockets 117 and 118 and a sprocket 119. The sprocket 119 is on a shaft 120 to supply power to the drive roller 80. By making the sprockets 115 and 119 the same size and the roller 36 slightly larger than the roller 80, the peripheral speed of the roller 80 is controlled at a fixed percentage of the peripheral speed of the roller 36 and slower than it, to give the tape tensioning and stetching which is needed and is desired.

The sprocket 119 is also employed to supply the main drive for a shaft 121, through a beveled gear drive 122. The shaft 121 is also the main shaft of a differential mechanism 123, which is connected to an auxiliary motor 125. The differential 123 carries a sprocket 126 that engages and drives a chain 127 which drives the shaft 41 by a sprocket 128. The differential 123 doubles the main drive speed, and the ratio between the sprockets 126 and 128 is 1:1. The motor 125 is reversible, can either speed up, keep constant, or decrease the speed of the sprocket 126 and therefore can change the speed of the shaft 41 relative to the speed of the drive roller 37. The motor 125, in turn, is controlled by the action of the tape-long compensating arm 52 through the cam 60 on its set of microswitches 56, 57, and 58, which are used to energize the motor 125 in a forward or a reverse direction. Thus, the cam surface 61 is provided with several steps 130, 131, 132, and 133 so that at certain tilts of this cam, the different microswitches 56, 57, and 58 are actuated. Thus, the microswitch 58 is actuated when the tape loop is too long and the cam 60 is tilted by the arm 52 moved into a position a few degrees below the horizontal position shown in FIG. 3, and actuation of the microswitch 58 by its follower 64 acts to actuate the auxiliary motor 125 to cause it to run backward to slow down the speed of the shaft 41 and make the tape 33 unwind more slowly and thereby shorten the loop between the roller 43 and the shaft 50. The switch 56 is actuated when the tape gets too short, so that the beam 52 tilts up to a position a few degrees above the horizontal position shown in FIG. 3, to cause the motor 125 to run forwardly to speed up the shaft 41 and thereby lengthen the tape loop. The third microswitch 57, in the center, is actuated only when the beam 52 is sharply tilted in either direction, as shown by dash lines in FIG. 3, and it, if actuated, operates to stop the entire machine, including all the drive motors.

The tape storage supply 44 is kept from excessive axial movement by the guide roller 49 (FIG. 10) mounted by bearings 76 on a spindle 77.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a seed-tape manufacturing machine, having a seed-dispensing means, the combination of:

main drive means, a main drive roller beyond the seed-dispensing means and driven by said main drive means, a main idler roller urged toward said main drive roller so that tape lying between them is propelled thereby, a secondary drive roller and a secondary idler roller preceding the seed-dispensing means and in contact with the tape, means connected to said main drive means for driving said secondary drive roller at a peripheral speed slower than that of said main drive roller, at a fixed fraction of the peripheral speed of said main drive roller, so that said tape is streached as it passes from said secondary drive roller and secondary idler roller to said main drive roller and main idler roller, supply support means supporting a drum-like cylindrical supply of tape for use in said machine, peripheral contact means for engaging the periphery of the cylinder of tape and positively unwinding it, guide and tension means for feeding the unwound tape to and between said secondary drive roller and said secondary idler roller, auxiliary drive means, differential means connecting said auxiliary drive means to said peripheral contact means, means driven by said main drive means for driving said peripheral contact means at a basic positive rate on which the differential superimposes a positive or negative speed determined by said auxiliary drive means, and control means responsive to the speed at which the tape unwinds relative to the speed of tape propulsion by said secondary rollers for changing the speed of said auxiliary drive means and thereby the speed at which said tape unwinds.

2. The machine of claim 1 wherein said guide and tension means includes a first shaft adjacent to said supply support means, over which said tape passes, and a second shaft over which said tape passes in tension between said first shaft and said secondary rollers and said control means comprises a pivoted beam supporting said second shaft for movement toward and away from said first shaft according to the length of said tape therebetween by swinging said beam upon its pivot, a cam supported by said beam, and a plurality of microswitches actuated by said cam, one said microswitch acting to accelerate said auxiliary drive means and therefore said peripheral contact means when said length is short enough to cause said beam to tilt a predetermined amount in one direction, and a second said microswitch acting to decelerate said auxiliary drive means and therefore said peripheral contact means when said length is long enough to cause said beam to tilt a predetermined amount in the opposite direction.

3. The machine of claim 2 having a third microswitch for stopping said machine entirely when the tension upon the tape is either too great or too small, at predetermined extreme positions of tilt of said beam.

4. The machine of claim 1 wherein said rollers are driven at the same rotational speed and said secondary drive roller is slightly smaller in diameter than said main drive roller.

5. The machine of claim 1 wherein both said idler rollers are mounted upon pivoted arms with spring means urging each said arm toward the respective said drive roller, and link means joining said arms for opening and closing them together.

6. The machine of claim 5 having back-lash means in said link whereby either of said idler rollers may be opened slightly independently of the other.

7. In a speed-tape manufacturing machine, the combination of:
  main drive means,
  a drive roller driven by said main drive means,
  an idler roller urged toward said drive roller so that tape lying between them is propelled by them,
  supply support means supporting a drum-like cylindrical supply of tape for use in said machine,
  peripheral contact means for engaging the periphery of the cylinder of tape and positively unwinding it,
  guide and tension means for feeding the unwound tape to and between said rollers,
  auxiliary drive means,
  differential means connecting said auxiliary drive means to said peripheral contact means,
  means driven by said main drive means for driving said peripheral contact means at a basic positive rate on which the differential imposes a positive or negative speed as determined by said auxiliary drive means, and
  control means responsive to the speed at which the tape unwinds relative to the speed of tape propulsion by said rollers for changing the speed of said auxiliary drive means and thereby the rate at which said tape unwinds.

8. The machine of claim 7 wherein:
  said guide and tension means includes a first shaft adjacent to said supply support means, over which said tape passes, and a second shaft over which said tape passes in tension between said first shaft and said rollers and
  said control means comprises
  a pivoted beam supporting said second shaft for movement toward and away from said first shaft according to the length of said tape, by swinging said beam upon its pivot,
  a cam supported by said beam, and
  a plurality of microswitches actuated by said cam,
  one said microswitch acting to accelerate said auxiliary drive means and therefore said peripheral contact means when said length is short enough to cause said beam to tilt a predetermined amount in one direction, and
  a second said microswitch acting to decelerate said auxiliary drive means and therefore said peripheral contact means when said length is long enough to cause said beam to tilt a predetermined amount in the opposite direction.

9. The machine of claim 8 having a third microswitch for stopping said machine entirely when the tension upon the tape is either too great or too small, at predetermined extreme positions of tilt of said beam.

10. In a seed-tape manufacturing machine, having seed-dispensing means, the combination of:
  main drive means,
  a main drive roller beyond the seed-dispensing means and driven by said main drive means,
  a main idler roller urged toward said main drive roller so that tape lying between them is propelled thereby,
  a secondary drive roller and a secondary idler roller preceding the seed-dispensing means and in contact with said tape,
  means for driving said secondary drive roller at a peripheral speed slower than that of said main drive roller and at a fixed fraction thereof,
  whereby said tape is stretched between the two sets of said rollers,
  both said idler rollers being mounted upon pivoted arms with spring means urging each said arm toward the respective said drive roller, and
  link means joining said arms for opening and closing them together.

11. The machine of claim 10 having back lash means in said link for enabling each idler roller to be moved a short distance away from its drive roller without moving the other idler roller.

12. In a seed-tape manufacturing machine, having a supply of tape and seed-dispensing means, the combination of:
  tape unwinding means for positively unwinding a supply of tape,
  main tape driving means for driving the tape past said seed-dispensing means,
  means controlled by said main tape driving means for driving said tape unwinding means at a basic rate, and
  control means responsive to the relative speed of the tape unwinding as compared to the speed of tape propulsion by said tape driving means for changing the speed of said tape unwinding means to a speed corresponding more closely to the speed of said tape driving means,
  said control means including auxiliary drive means and a differential driven by said auxiliary drive means and connected to said tape unwinding means for superimposing on the basic speed of the tape-unwinding means, as determined by said tape driving means, the controlled speed of said auxiliary drive means.

13. In a seed-tape manufacturing machine, having a supply of tape and seed-dispensing means, the combination of:
  tape unwinding means for positively unwinding a supply of tape,
  main tape driving means for driving the tape past said seed-dispensing means,
  means controlled by said main tape driving means for driving said tape unwinding means at a basic rate, and
  control means responsive to the relative speed of the tape unwinding as compared to the speed of tape propulsion by said tape driving means for changing the speed of said tape unwinding means to a speed corresponding more closely to the speed of said tape driving means,
  said control means including means for passing said tape between two guide means and means for changing said tape unwinding speed according to the length of tape between said two guide means.

14. The machine of claim 13 wherein one said guide means is supported by a pivoted beam for swinging movement of the first said guide means toward and away from the other said guide means according to the length of said tape, by moving said beam about its pivot, a cam supported by said beam, and a plurality of microswitches actuated by said cam, one said microswitch acting to accelerate said tape-unwinding speed when said length is short enough to cause said beam to tilt a predetermined amount in one direction, and a second said microswitch acting to decelerate said tape-unwinding speed when said length is great enough to cause said beam to tilt a predetermined amount in the opposite direction 15. The machine of claim 14 having a third microswitch for stopping said machine entirely when the length is either too great or too small, at predetermined extreme positions of said beam.

16. In a seed-tape manufacturing machine, having seed-dispensing means and a storage roll of tape, the combination of:
  main tape drive means, beyond the seed-dispensing means,
  secondary tape drive means preceding the seed and dispensing means, means connected to both said drive means for driving said secondary drive means at a peripheral speed slower than that of said main drive means, so that said tape is stretched as it passes from said secondary drive means, to said main drive means, tape unwinding means for positively unwinding said tape from its storage roll, driven at a basic speed by said main drive means, and control means responsive to the relative speed at which the tape unwinds as compared to the speed of tape propulsion by said tape drive means for changing the speed of said tape unwinding means

References Cited
UNITED STATES PATENTS

| | | | |
|---|---|---|---|
| 3,152,794 | 10/1964 | Alexeff et al. | 226—44X |
| 3,334,838 | 8/1967 | Kopp | 242—78.7 |
| 1,160,278 | 11/1915 | Gray et al. | 53—180 |

TRAVIS S. McGEHEE, Primary Examiner

E. F. DESMOND, Assistant Examiner

U.S. Cl. X.R.

242—67.2, 78.7

PO-1050
(5/69)

UNITED STATES PATENT OFFICE
CERTIFICATE OF CORRECTION

Patent No. 3,555,774                    Dated   January 19, 1971

Inventor(s)   B.M. Craig

It is certified that error appears in the above-identified patent and that said Letters Patent are hereby corrected as shown below:

Column 1, line 18, insert -- lying -- after "tape line 53, "soluable" should read -- soluble --. Column 2, line 23, "speed" should read -- seed --; line 37, "provoding" should read -- providing --. Column 3, line 24, "views" should read -- view --. Column 5, line 34, "stetching" should read -- stretching --; line 47 "tape-long" should read -- tape-loop --. Column 6, line 7, delete "a" after "having" Column 7, line 8, "speed-tape" should read -- seed-tape --.

Signed and sealed this 16th day of November 1971.

(SEAL)
Attest:

EDWARD M. FLETCHER, JR.                ROBERT GOTTSCHALK
Attesting Officer                       Acting Commissioner of Pat